Figure 1:
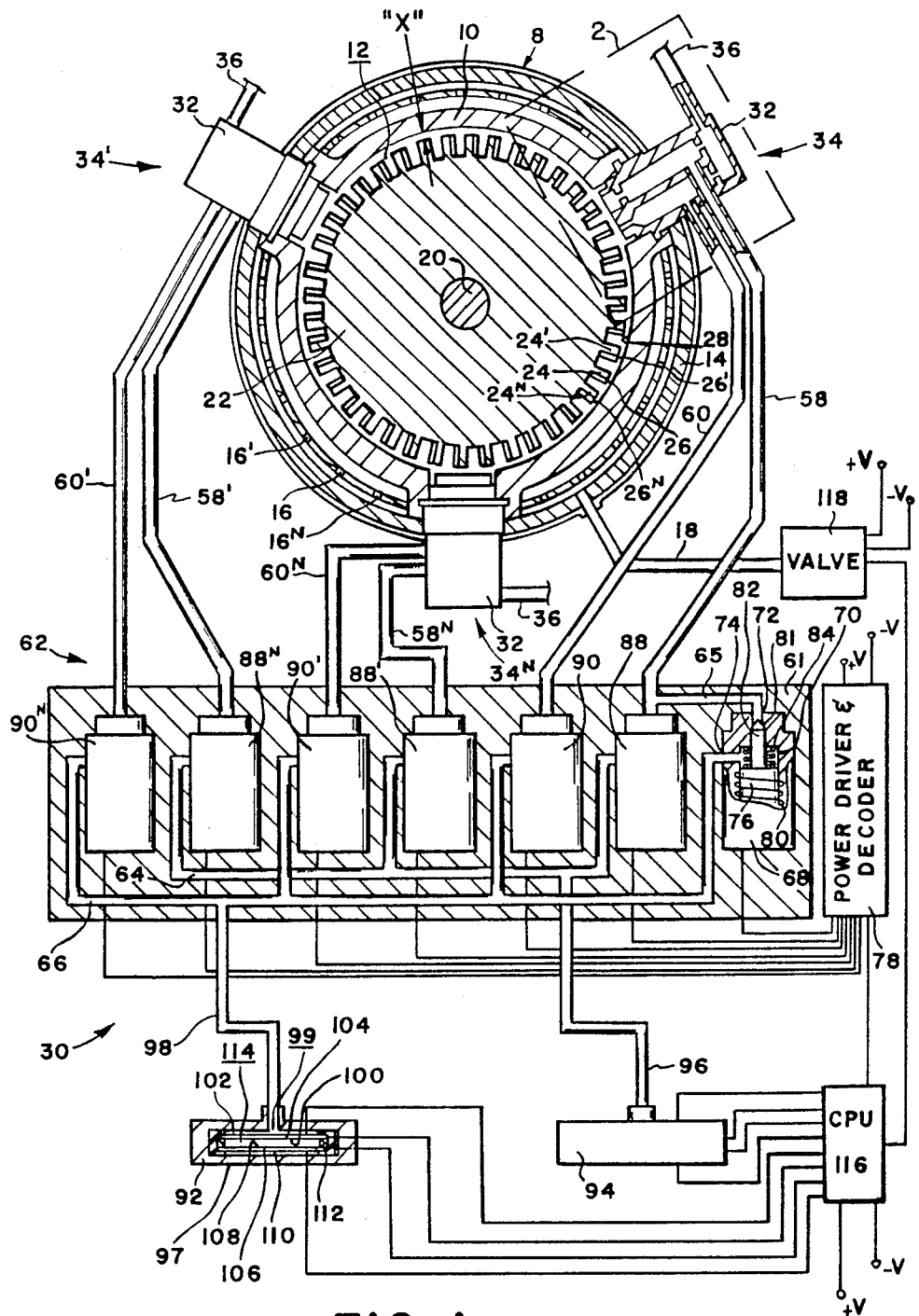

United States Patent [19]

Perkey et al.

[11] Patent Number: 4,971,517

[45] Date of Patent: Nov. 20, 1990

[54] TURBINE BLADE CLEARANCE CONTROLLER

[75] Inventors: Russell C. Perkey, Granger, Ind.; Nickie L. Stanage, Cassopolis, Mich.

[73] Assignee: Allied-Signal Inc., Morristown, N.J.

[21] Appl. No.: 292,612

[22] Filed: Dec. 27, 1988

[51] Int. Cl.$^5$ .................... F01D 11/00; F01D 25/12
[52] U.S. Cl. .................................. 415/14; 415/16; 415/175
[58] Field of Search ............... 415/14, 16, 117, 47, 415/127, 73, 128, 173.2, 174.1, 175

[56] References Cited

U.S. PATENT DOCUMENTS

| | | | |
|---|---|---|---|
| 3,561,216 | 2/1971 | Moore | 415/14 |
| 4,384,819 | 5/1983 | Baker | 415/127 |
| 4,632,635 | 12/1986 | Thoman et al. | 415/14 |
| 4,657,479 | 4/1987 | Brown et al. | 415/127 |
| 4,683,716 | 8/1987 | Wright et al. | 415/173.2 |

FOREIGN PATENT DOCUMENTS 0018207  1/1984  Japan ..................... 415/14

*Primary Examiner*—Robert E. Garrett
*Assistant Examiner*—Hoang Nguyen
*Attorney, Agent, or Firm*—Leo H. McCormick, Jr.; Ken C. Decker

[57] ABSTRACT

A control system 30 for measuring the clearance "x" between the tip 26 of a blade 24 and wall 28 in a turbine engine8. A series of probes 32, 32' and 32$^N$ located in the wall 28 each have a reference orifice 52 and a sensing orifice 54. Fluid from a source flows through the reference orifices 52 into the turbine engine. This fluid flow is substantially unrestricted and as a result a fluid pressure $P_2$ is established in a reference chamber 44. Fluid flow from the sensing orifice 54 is restricted by the relationship of the tip 26 of each blade 24 and as a result fluid pressure $P_2'$ is created in chamber 48. A multiplexer 62 sequentially provides transducer 92 and 94 with fluid pressure $P_2$ from the reference chamber 44 and $P_2'$ from sensing chamber 48. The transducers 92 and 94 convert the pneumatic signals into electrical signals which are supplied to a computer 116. The computer 116 supplies a control member 118 with a operational signal to allow cooling air to flow to housing 10 to maintain a desired tip clearance "x" for the blades of the turbine.

7 Claims, 2 Drawing Sheets

TURBINE BLADE CLEARANCE CONTROLLER

This invention relates to a controller for maintaining the clearance between the tip of each blade of a turbine and an engine housing within set limits during changes in operating parameters of the turbine.

Currently the most efficient power source for operating a high performance aircraft is a gas turbine engine. Because such turbine engines operate under high temperature and pressure, the individual piece parts such as the turbine blades and housing do not always expand and contract at the same rate. The efficiency of such engines is directly dependent on the clearance between the tip of the blades and the engine housing. One method of controlling blade tip clearance is through an open loop wherein clearance is reduced by cooling the engine housing using air flow based on the revolutions per minute of the turbine and the operating altitude of the aircraft. This type of control is based on extensive engine testing and measurements that occur as a result of changes of pressure and temperature. A common method of making such measurement is through the use of a laser light beam, fiber optics and a prism located in the engine housing. The prism is located in the engine housing and projects a laser beam through slotted holes onto the tip of the blades. As the clearance between the tip of the blades and housing change, the projected image of the laser beam changes. This change is transmitted by fiber optics to a computer wherein computations are made to determine the air required to bring the clearance back to a set limit. At best this method can only provide clearance control with limited accuracy since every engine while manufactured under the same condition do not perform in the same manner even though the parts therein are nominally the same.

An effective way to improve fuel efficiency of a gas turbine engine is to use a closed loop to control the blade tip clearance. By achieving more accurate control of blade clearance, lower means clearance can be maintained. It has been estimated that % more fuel is required to operate a modern large turbo fan engine for each 0.038 cm excess in clearance. Continuous sensing of actual clearance for each engine has been difficult because of the high operating temperatures of the engine chamber and occasional abrading of the engine housing caused by the tip of each turbine blade.

The method of clearance measurement by laser is not suitable for routine flight use because of its sensitivity to contamination, its inability to compensate for abrading and its relatively high system cost and weight.

U.S. Pat. No. 3,754,433 discloses structure for sensing the proximity of compressor blade tips to a housing This structure responds to a pressure differential between a reference pressure and the average pressure produced by the interruption by the compressor blades of the flow of air from the compressor through an orifice. This type of structure is not satisfactory for sensing turbine blade clearance because the higher temperature and the combustion products content in the operating fluid exiting from the turbine chamber would have a detrimental affect on the orifices used to generate the pressure differential.

U.S. Pat. No. 4,632,635 discloses a pneumatic sensor system for controlling the space relationship between a turbine blade tip and the housing. This system while operating in a satisfactory manner has not been placed into production.

This invention is the result of a study designed to develop a simple, reliable and rugged control system for the continuous measurement of the clearance between a rotor blade tip and the wall of an engine housing. In this system a series of pneumatic sensor probes are located in the wall of the housing. Fluid under pressure $P_1$ from a source is supplied to a sensing chamber and reference chamber in each probe. Fluid from the sensing chamber and reference chamber flows through a sensing orifice and a reference chamber, respectively, into the engine housing. The flow through the reference orifice being uneffected by the proximity of the tip of the blade to the wall creates a fluid pressure $P_2$ in a reference chamber while the proximity of the tip with respect to the sensing orifice results in a fluid pressure change to $P_2'$ in a sensing chamber. The resulting fluid pressures $P_2$ and $P_2'$ from each probe are subsequently presented to a pneumatic multiplexer. The multiplexer includes a control valve and a series of pressure valves connected to the probes. A power supply unit in the multiplexer is connected to and supplies the control valve and series of pressure valves with an energy signal in response to an operational input from a central computer unit. The control valve and series of pressure valves are connected to a sensing transducer and a reference transducer. These transducers are identical and more fully described in U.S. Pat. No. 4,422,335. In response to an operational signal from the central computer unit, the power supply unit activates the control valve to allow fluid pressure $P_2$ to flow to sensing chambers in the sensing transducer and reference transducer and establish a base or reference signal. Thereafter, the control valve is deactivated and the series of valves sequentially activated to allow the output fluid pressures $P_2$ and $P_2'$ to be presented to the sensing chamber in the sensing and reference transducers. Signals representing a resulting pressure differential measured by the sensing transducer and reference transducer are evaluated in the central computer unit to create an operational signal. The operational signal is modified by the base or reference signal to create an absolute signal which represents the clearance between the tip of the blades and the turbine housing.

An advantage of this control system results in the continual update of the reference signal by the multiplexer to compensate for changes in temperature, altitude, and operational fluid pressure of the engine to maintain a desired turbine blade tip clearance with the engine housing.

An object of this invention is to provide a turbine blade clearance controller with an operational input resulting from a series of measured differential pressures produced at various locations by the flow of fluid through a sensing orifice and a reference orifice in a probe as evaluated by an electrical signal supplied to a computer from a capacitance pressure transducer.

Figure 2:
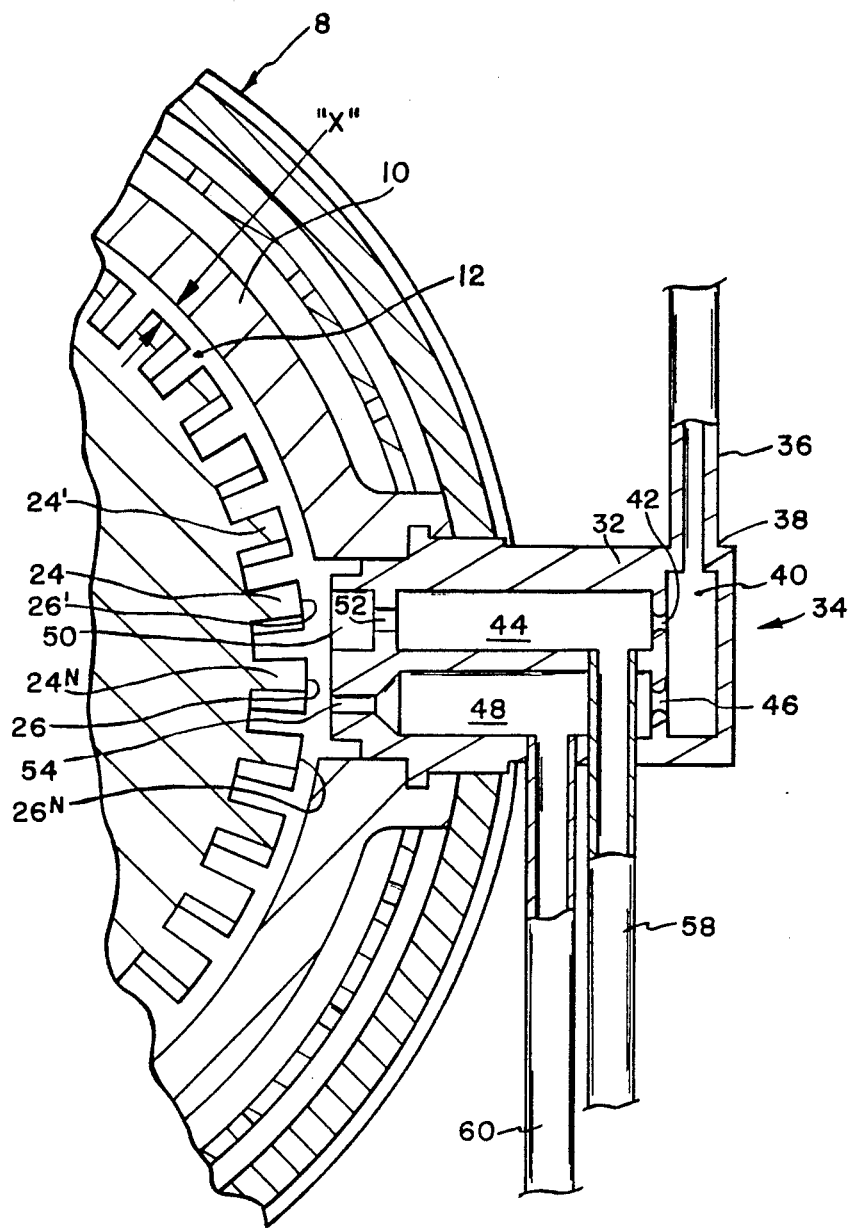

These advantages and object should be apparent from reading this specification while viewing the drawings wherein:

FIG. 1 is a sectional view of an operating chamber of a turbine engine having probes located at various locations in the wall to sense a space relationship of the turbine blade tip and the wall and provide a multiplexer with operational pressure signals for presentation to pressure transducers connected to an operational computer unit in accordance with the principles of this invention; and FIG. 2 is an enlarged sectional view of the probe in FIG. 1 and its relationship with the wall.

The turbine engine 8 has a housing 10 with a chamber 12 located therein. A manifold 14 which surrounds housing 10 has a series of openings 16, 16', ... $16^N$ located on its inside diameter for directing cooling air received from a source, fan or low pressure compressor air, through a conduit 18 to the periphery of housing 10. Under some circumstances, more than one connection may exist between conduit 18 and manifold 14 to provide for more uniform distribution of the fluid.

A shaft 20 retained in bearings, (not shown) in the housing extends into chamber 12. A hub 22 secured to the shaft 20 has a plurality of blades 24, 24', ... $24^N$ attached hereto. Shaft 20 is rotated in chamber 12 as combustion gases move past blades 24, 24', ... $24^N$. A set clearance "x" is established between the tip 26 of each blade 24 and the wall 28 of chamber 12. The turbine engine expands as the housing 10, shaft 20, hub 22, and blades 24, 24', ... $24^N$, are heated and exposed to high pressure of the combustion gases that flow through chamber 12. If the hub 22 and blades 24, 24', ... $24^N$ expand at a faster rate than the housing 10, the tip 26 of each blade 24 may come into contact with wall 28 after closing the clearance x and abrade either the tip 26 or wall 28. Later as the expansion rates stabilize or are reduced, such abrasion may adversely affect the efficiency of the turbine engine. If the wall 10 expands faster than the hub 22 and blades 24, 24', ... $24^N$, the clearance x will be exceeded which also results in a decrease in the efficiency of the turbine engine 8.

In order to match the rate of expansion and contraction of the housing 10 with the turbine blades 24, 24', ... $24^N$ and hub 22 and thereby maintain a desired clearance x, a controller 30 made according to the principals of this invention was provided for the turbine engine 8.

Fluid from a source having a fluid pressure $P_1$ flows through conduit 36 to housings 32, and 32' and $32^N$ of probes 34, 34' and $34^N$ located in wall 28. The number of probes 34 may vary and under some circumstances one may be sufficient to provide adequate information with respect to the relationship between the tip 26 of blades 24,24'... $24^N$ and wall 28 but it has been found a more accurate understanding of this relationship can be obtained through the use of multiple probes 34.

Since each probe is identical, the following description equally applies for each probes 34, 34' and $34^N$, of which probe 34 is shown in an enlarged sectional view in FIG. 2.

As shown in FIG. 2, fluid under pressure $P_1$ enters housing 32 of probe 34 through inlet port 38 and flows into chamber 40. Chamber 40 has a first opening 42 connected to a reference chamber 44 and a second opening 46 connected to a sensing chamber 48. A first orifice 52 in housing 32 connects the reference chamber 44 with a recess 50 which is opened to chamber 12 in engine 8. A second orifice 54 in housing 32 directly connects sensing chamber 48 with chamber 12. The blades 24, 24', ... $24^N$ have a desired clearance "x" between the tips 26, 26', ... $26^N$ and wall 28. Fluid flows through reference orifice 52 and sensing orifice 54 into chamber 12 which has a fluid pressure $P_3$. Recess 50 is large enough such that fluid flow from orifice 52 is not effected by the clearance of the tip 26 of blades 24, 24', ... $24^N$ and wall 28, even when the tip clearance is small or even touching. Conversely, the sensing orifice 54 which has a small diameter, approximately one half the size of orifice 52, has its effective area is reduced each time a tip 26 of a turbine blades 24, 24', ... $24^N$ is aligned with sensing orifice 54. The effective area is equated with or proportional with tip clearance "x". Movement of blades 24, 24', ... $24^N$ past orifices 54, produces pulses in the flow of fluid from sensing chambers 48. The compressibility of the fluid in the sensing chamber 48 cushion these pulses but an increase in the average fluid pressure in the sensing chamber 48 occurs and a fluid pressure of $P_2'$ is created. It has been found that the variation in this fluid pressure can be equated with the clearance between the tip 26 of blades 24, 24', ... $24^N$ and wall 28.

The reference fluid pressure $P_2$ from probes 34, 34' and $34^N$ is communicated by conduits 58, 58' and $58^N$ and the sensing fluid pressure $P_2'$ is communicated by conduits 60, 60' and $60^N$ to a multiplexer arrangement 62 in the controller 30.

Multiplexer arrangement 62 has a housing 61 with a reference passageway 64 and a sensing passageway 66. A reference solenoid valve 68 located in housing 61 has a bore 70 with an entrance port 72 connected to passageway 64 by a passageway 65 and an exit port 74 connected to passageway 66. Actuation of solenoid 76 by an input from control or power supply member 78 allows electrical current to flow to coil 80 and move plunger 82 in opposition to spring 84 to permit communication between reference passageway extension 65 and passageway 66. A first series of solenoid valves 88, 88' and $88^N$ located in housing 61 control the communication of the reference fluid pressure $P_2$ from conduits 58, 58' and $58^N$ into reference passageway 64 while a second series of solenoid valves 90, 90' and $90^N$ located in housing 61 control the communication of the sensing fluid pressure $P_2'$ from conduits 60, 60' and $60^N$ into sensing passageway 66. Solenoids valves 88, 88' and $88^N$ and 90, 90' and $90^N$ are all connected to the control member 78 and supply pressure transducer 92 and 94 with inputs through conduits 96 and 98, respectively.

Transducers 92 and 94 are identical in structure and the basic details will only be described with respect to transducer 92 which is illustrated in FIG. 1. The finite details for such transducers are more fully described in U.S. Pat. No. 4,422,335.

Transducer 92 has a housing 97 with a sealed pressure chamber 99. A first quartz disc 100 has a conductive pattern 102 printed on its external surface and a common electrode 104 on its inner surface. A second quartz disc 106 has an electrode 108 segmented into four capacitor signal plates on its inner surface and a conductive pattern printed on its external surface 110. The two electrodes 104 and 108 oppose each other across a separation to form four capacitors. An annular glass frit 112 provides the separation or gap and seals the space between the electrodes 104 and 108 to form a reference chamber 114. Thereafter, electrodes 104 and 108 of each transducer 92 and 94 are connected to a central computer unit 116.

Computer 116 is connected to the control member 78 in the multiplexer arrangement 62 and a control valve 118 which directs cooling air to conduit 18.

MODE OF OPERATION OF THE INVENTION

In operation shaft 20 rotates to move the blades 24, 24', ... $24^N$ within chamber 12 while fan or low pressure compressor cooling air flows in conduit 18 to the manifold 14. Air that enters manifold 14 flows through openings 16, 16', ... $16^N$ in the housing 10 and then passes to the surrounding environment.

At the same time air from a source having a fluid pressure $P_1$ flows in conduit 36 to probes 32, 32' and $32^N$. Air flows through openings 42 in each probe 32 into reference chamber 44 and out the reference orifice 52 into chamber 12. The size of reference orifice 52 and the fluid pressure $P_3$ in chamber 12 create a fluid pressure $P_2$ in the reference chamber 44 while air flows through opening 46 into sensing chamber 48 and into chamber 12 through orifice 54. The movement of the tip 26 of each blade 24, 24' ... $24^N$ past orifice 54 causes a restriction of flow from chamber 48 and as a result an increase in the fluid pressure $P_2$ in chamber 48 to $P_2'$.

The multiplexer arrangement 62 receives a logic or operational signal from computer 116 and sends out the following sequential set of operational signals each second. Initially solenoid valve 68 is actuated to allow fluid pressure $P_2$ to be communicated from conduit 58 through passageway segment 65 into sensing passageway 66 for presentation to chamber 99 in pressure transducer 92. With fluid pressure $P_2$ in chamber 99, the quartz substrates 100 and 106 react to produce an error or reference signal as a result in a change in capacitance. This error or reference signal is stored in the central computer 116. After a period of time (about 250 milliseconds), the operational signal to solenoid valve 68 terminates and spring 84 moves plunger 82 against a seat 81 to prevent further communication of fluid pressure $P_2$ between inlet port 72 and outlet port 74. Thereafter, the solenoid valves 88 and 90 associated with probe 32 are activated to allow fluid pressure $P_2$ to be communicated to transducer 94 and fluid pressure $P_2'$ to be communicated to transducer 92. The quartz plates or disc in transducer 94 react to fluid pressure $P_2$ to produce a reference or base signal which is supplied to computer 116. At the same time the quartz plates or disc in transducer 92 react to fluid pressure $P_2'$ to produce a sensing or operational signal which is supplied to computer 116. The operational signal is modified by the base and/or error signal to produce an absolute signal. This absolute signal represents the clearance x between the tip 26 of blades 24, 24', ... $24^N$ and wall 28. Thereafter, solenoids 88' and 90' and $88^N$ and $90^N$ are sequentially activated and reference and operational signals supplied to computer 116 for probes 32' and $32^N$. A complete scan or evaluation of the relationship between the tip 26 of blades 24, 24', ... $24^N$ and wall 28 takes place in 1 second. During this evaluation transducers 92 and 94 perform at least three functions in this controller 30:

(1) transform pneumatic signals from probes 32, 32' and $32^N$ into electrical signals;
(2) compute or measure the differential pressure, $$\frac{P_2 - P_2'}{P_2}$$

for each probe; and
(3) synchronize the operational signals from multiplexer arrangement 62 to the solenoid valves.

Depending on the desired clearance "x", the computer 116 supplies control 118 with a signal to control the flow of cooling air through conduit 18. The change in flow of cooling air to manifold 14 causes housing 10 to react and maintain the desired clearance "x".

We claim:

1. In a turbine engine having an engine housing with an operational chamber therein, a shaft located in said engine housing and extending into said operational chamber, a plurality of blades attached to said shaft and rotatable within said operational chamber, each of said blades having a tip that extends to a position adjacent the engine housing to define a desired clearance therebetween, said clearance being affected by operating engine parameters comprising temperature, pressure, engine speed, the improvement comprising:

probe means having a housing with a first chamber and a second chamber, said first chamber having a first orifice connected to said operational chamber and a first inlet port connected to a source of fluid having a fluid pressure $P_1$, said source of fluid flowing through said first orifice into said operational chamber to produce fluid pressure $P_2$ in said first chamber, said second chamber having a second orifice connected to said operational chamber and a second inlet port connected to said source of fluid having a fluid pressure $P_1$, said source of fluid flowing through said second orifice into said operational chamber, said tip of each blade restricting the flow of fluid through said second orifice to produce a fluid pressure $P_2'$ in said second chamber;

multiplexer means having a control valve connected to said first chamber, a first valve connected to said first chamber and a second valve connected to said second chamber;

pressure transducer means having a wall for separating a reference pressure chamber from a sensing pressure chamber, said reference pressure chamber being connected to said first valve, said sensing pressure chamber being connected to said control valve and said second valve; and operational computer means responsive to an operational input to define a cycle of operation corresponding to rotation of said shaft within said chamber, said computer means sequentially activating said control valve to allow fluid pressure $P_2$ to flow to the sensing pressure chamber and to create a base signal from a pressure differential established across said wall and thereafter deactivating said control valve and activating said first and second valves to allow fluid pressure $P_2$ to be communicated to said reference pressure chamber and fluid pressure $P_2'$ to be communicated to said sensing pressure chamber to create an operational signal from a pressure differential established across said wall, said operational signal being modified by said base signal to define an absolute operational signal representative of the then current clearance between said tip and engine housing.

2. In a turbine engine as recited in claim 1, wherein said pressure transducer means changes pneumatic signals into electrical signals for transmission to the operational computer means.

3. In the turbine engine as recited in claim 2, wherein said electrical signals from the pressure transducer means supplied to said operational computer means form a basis for electrical signals communicated to said multiplexer means for sequentially operating the control valve and first and second valves.

4. In the turbine engine as recited in claim 3, wherein said probe means includes a plurality of sensing units located around the engine housing to obtain an average clearance for the tip of the blade during a cycle of operation of the multiPlexer means.

5. In the turbine engine as recited in claim 4, wherein said cycle of operational of the multiplexer means is completed in about 1 second.

6. In the turbine engine as recited in claim 5, wherein said multiplexer means includes:
- a first solenoid valve for controlling fluid pressure communication in establishing the base signal;
- second and third solenoid valves connected with each sensing unit of said probe means; and
- an electrical control responsive to operational signals from said operational computer means to sequentially provide fluid pressure reading to said pressure transducer means.

7. In the turbine engine as recited in claim 6, wherein said pressure transducer means includes:
- a first quartz capacitor member connected to receive said fluid pressure $P_2$ to develop a reference signal; and
- a second quartz capacitor member connected to receive fluid pressure $P_2'$ to develop an operational signal, said computer means analyzing said operational signal and reference signal to define the clearance relationship.

* * * * *